(12) United States Patent
Ueno

(10) Patent No.: US 9,218,484 B2
(45) Date of Patent: Dec. 22, 2015

(54) CONTROL METHOD AND INFORMATION PROCESSING APPARATUS

(71) Applicant: FUJITSU LIMITED, Kawasaki-shi, Kanagawa (JP)

(72) Inventor: Keizou Ueno, Kato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/066,439

(22) Filed: Oct. 29, 2013

(65) Prior Publication Data

US 2014/0164787 A1    Jun. 12, 2014

(30) Foreign Application Priority Data

Dec. 6, 2012    (JP) .................................. 2012-267675

(51) Int. Cl.
G06F 11/30    (2006.01)
G06F 12/14    (2006.01)
G06F 21/53    (2013.01)

(52) U.S. Cl.
CPC ...................................... G06F 21/53 (2013.01)

(58) Field of Classification Search
CPC ...................................................... G06F 21/00
USPC ......................................................... 713/189
See application file for complete search history.

(56) References Cited

U.S. PATENT DOCUMENTS

| 8,296,581 | B2* | 10/2012 | Jennings et al. | ............... | 713/193 |
| 8,473,750 | B2* | 6/2013 | Cox et al. | ...................... | 713/189 |
| 2006/0265562 | A1* | 11/2006 | Nishiguchi et al. | ........... | 711/163 |
| 2008/0065907 | A1* | 3/2008 | Nutter et al. | .................. | 713/193 |
| 2008/0162784 | A1* | 7/2008 | Obereiner et al. | ............ | 711/103 |
| 2010/0332850 | A1* | 12/2010 | Boivie | ......................... | 713/189 |
| 2011/0044451 | A1 | 2/2011 | Anzai et al. | | |
| 2012/0278608 | A1* | 11/2012 | Kohiyama et al. | ............ | 713/150 |

FOREIGN PATENT DOCUMENTS

JP           11-39158 A         2/1999
WO    WO 2009/013825 A1    1/2009

* cited by examiner

*Primary Examiner* — Jason Lee
*Assistant Examiner* — Khalil Naghdali
(74) *Attorney, Agent, or Firm* — Arent Fox LLP

(57) ABSTRACT

A control method is executed by an information processing apparatus that includes a first processor; a second processor that executes a program to be protected; first memory that is shared between the first and the second processors; and nonvolatile second memory that stores the program to be protected. The control method includes reading the program that is to be protected and stored in the second memory, when the information processing apparatus is started up; encrypting the read program only once after start up of the information processing apparatus; writing the encrypted program into the first memory; and decrypting the encrypted program that is written in the first memory, and causing the second processor to execute the decrypted program.

6 Claims, 11 Drawing Sheets

CONTROL METHOD AND INFORMATION PROCESSING APPARATUS

CROSS REFERENCE TO RELATED APPLICATIONS

This application is based upon and claims the benefit of priority of the prior Japanese Patent Application No. 2012-267675, filed on Dec. 6, 2012, the entire contents of which are incorporated herein by reference.

FIELD

The embodiments discussed herein are related to a control method and an information processing apparatus.

BACKGROUND

An information processing apparatus equipped with a secure central processing unit (CPU) and a non-secure CPU to detect tampering of a program is commonly known (see, for example, Published Japanese-Translation of PCT Application, Publication No. 2009-013825). Another technology is known that in a processing apparatus, a large-scale integration (LSI) that is configured to integrate on one chip, a read only memory (ROM) such as a flash memory, a random access memory (RAM), and a processing unit, to block the reading of confidential information (secret key) of the processing apparatus itself and thereby, prevent unintended operation of the processing apparatus consequent to malice intention (see, e.g., Japanese Laid-Open Patent Publication No. H11-039158).

A configuration for a RAM to be shared between a first processor controllable by a user and a second processor not controllable by the user can be considered based on the conventional techniques. With this configuration, it can be considered that a program that is to be protected is expanded from the ROM onto the shared RAM; it is checked whether the program has been subject to tampering; if it is determined that the program is a legitimate program, the program is encrypted and transferred to another area of the shared RAM; and the second processor is caused to decrypt and execute the program.

Nonetheless, the program that is to be protected is transferred from the ROM to the RAM and is further transferred within the RAM and consequently, a problem arises in that the time consumed for starting up the program increases.

SUMMARY

According to an aspect of an embodiment, a control method is executed by an information processing apparatus that includes a first processor; a second processor that executes a program to be protected; first memory that is shared between the first and the second processors; and non-volatile second memory that stores the program to be protected. The control method includes reading the program that is to be protected and stored in the second memory, when the information processing apparatus is started up; encrypting the read program only once after start up of the information processing apparatus; writing the encrypted program into the first memory; and decrypting the encrypted program that is written in the first memory, and causing the second processor to execute the decrypted program.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments if a control method and an information processing apparatus will be described in detail with reference to the accompanying drawings.

Figure 1:
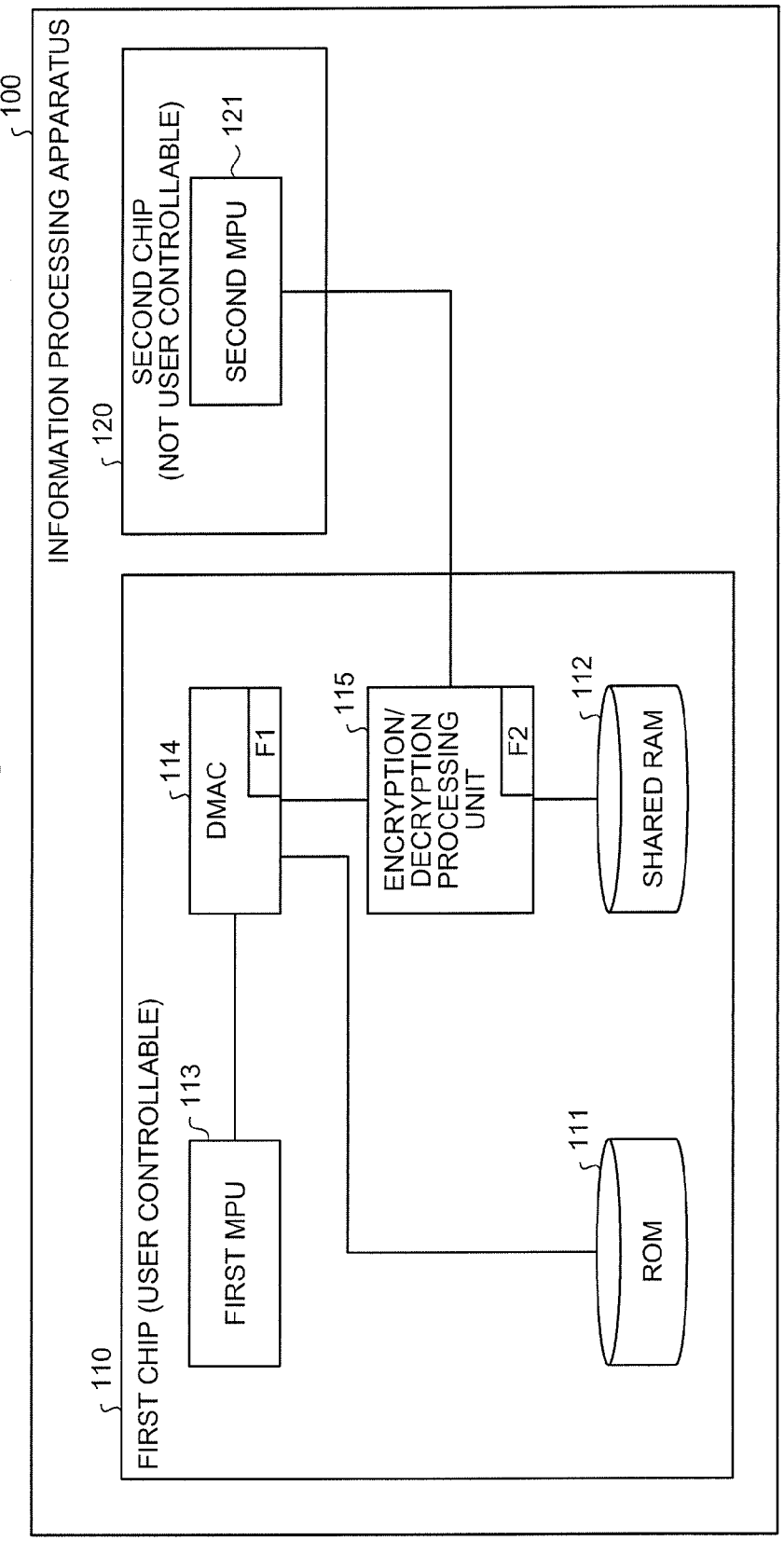
FIG. 1 is a diagram of an example of a configuration of an information processing apparatus according to a first embodiment.

FIG. 1 is a diagram of an example of a configuration of the information processing apparatus according to a first embodiment. As depicted in FIG. 1, the information processing apparatus 100 according to the first embodiment includes a first chip 110, and a second chip 120.

The first chip 110 is a microcomputer controllable by the user. For example, the first chip 110 is a microcomputer that the user can cause to execute an arbitrary program, write arbitrary data, and read arbitrary data.

The second chip 120 is not controllable by the user and is a microcomputer that executes programs that are to be protected. For example, the second chip 120 is a microcomputer that the user cannot cause to execute an arbitrary program, write arbitrary data, or read arbitrary data.

The first chip 110 includes a ROM 111, a shared RAM 112, a first micro processing unit (MPU) 113, a direct memory access controller (DMAC) 114, and an encryption/decryption processing unit 115.

The ROM 111 (second memory) stores data and programs to be executed by the first MPU 113 and a second MPU 121. For example, a predetermined area of the ROM 111 stores programs (programs to be protected) to be executed by the second chip 120. For example, a non-volatile memory such as an electrically erasable programmable read only memory (EEPROM) may be used as the ROM 111.

The shared RAM 112 (first memory) is memory shared between the first MPU 113 of the first chip 110 and the second MPU 121 of the second chip 120. The shared RAM 112 is used, for example, as work areas of the first MPU 113 and the second MPU 121.

The first MPU 113 (first processor) reads a program stored in the ROM 111, expands the read program onto the shared RAM 112 via the DMAC 114, and executes the program. For example, when the information processing apparatus 100 is started up, the first MPU 113 outputs to the DMAC 114, a transfer instruction signal to instruct the transfer of the program to be executed by the second chip 120.

The DMAC 114 transfers the program from the ROM 111 to the shared RAM 112 according to the transfer instruction signal output from the first MPU 113. For example, when the transfer instruction signal is output from the first MPU 113, the DMAC 114 reads the program stored in the predetermined area of the ROM 111. The program stored in the predetermined area of the ROM 111 may be read by, for example, referring to an initial program loader (IPL) program stored in the ROM 111.

The DMAC 114 outputs the read program to the encryption/decryption processing unit 115 and thereby, writes the read program into the predetermined area of the shared RAM 112 via the encryption/decryption processing unit 115. Thus, the DMAC is able to transfer the program to be executed by the second MPU 121 from the ROM 111 to the shared RAM 112 via the encryption/decryption processing unit 115. When the DMAC 114 transfers a program (program not to be protected) to be executed by the first MPU 113 from the ROM 111 to the shared RAM 112, the DMAC 114 may transfer this program without using the encryption/decryption processing unit 115. The DMAC 114 retains in a register, etc., a first flag F1 that indicates whether a program transfer session to be executed is the first transfer session.

The encryption/decryption processing unit 115 encrypts the program that is output from the DMAC 114 and that is to be executed by the second MPU 121, and writes the encrypted program into the predetermined area of the shared RAM 112. When the second MPU 121 outputs a read instruction signal, the encryption/decryption processing unit 115 reads the encrypted program written in the predetermined area of the shared RAM 112, decrypts the read program, and outputs the decrypted program to the second MPU 121. For example, any one of various methods such as the data encryption standard (DES), the advanced encryption standard (AES), and the Rivest Shamir Adleman (RSA) may be adopted as the encryption method employed by the encryption/decryption processing unit 115.

The encryption/decryption processing unit 115 checks whether the program that is output from the DMAC 114 and that is to be encrypted has been subject to tampering. If the encryption/decryption processing unit 115 determines that the program has been subject to tampering, the encryption/decryption processing unit 115 does not encrypt the program. Any one of various methods can be employed as the method for the encryption/decryption processing unit 115 to investigate tampering such as, for example, an addition of information such as parity or a cyclic redundancy check (CRC); or hash value computation.

The encryption/decryption processing unit 115 retains by a register, etc., a second flag F2 that indicates whether an encryption session to be executed is the first encryption session. The encryption/decryption processing unit 115 may be implemented by, for example, a computation circuit such as a digital signal processor (DSP).

The second chip 120 includes the second MPU 121. The second MPU 121 (second processor) is a processor that executes the program to be protected. For example, when the second MPU 121 is started up, the second MPU 121 outputs the read instruction signal to the DMAC 114 and thereby, reads the program stored in the predetermined area of the shared RAM 112. In this case, the program to be read is stored encrypted in the shared RAM 112. However, the second MPU 121 can read the program in a decrypted state by reading the program via the encryption/decryption processing unit 115.

As described, in the information processing apparatus 100, when the information processing apparatus 100 is started up, the DMAC 114 reads the program that is to be protected and stored in the ROM 111; and the encryption/decryption processing unit 115 encrypts the read program just one time after the information processing apparatus 100 is started up, writes the encrypted program into the shared RAM 112, decrypts the encrypted program written in the shared RAM 112, and causes the second MPU 121 to execute the decrypted program.

Figure 2:
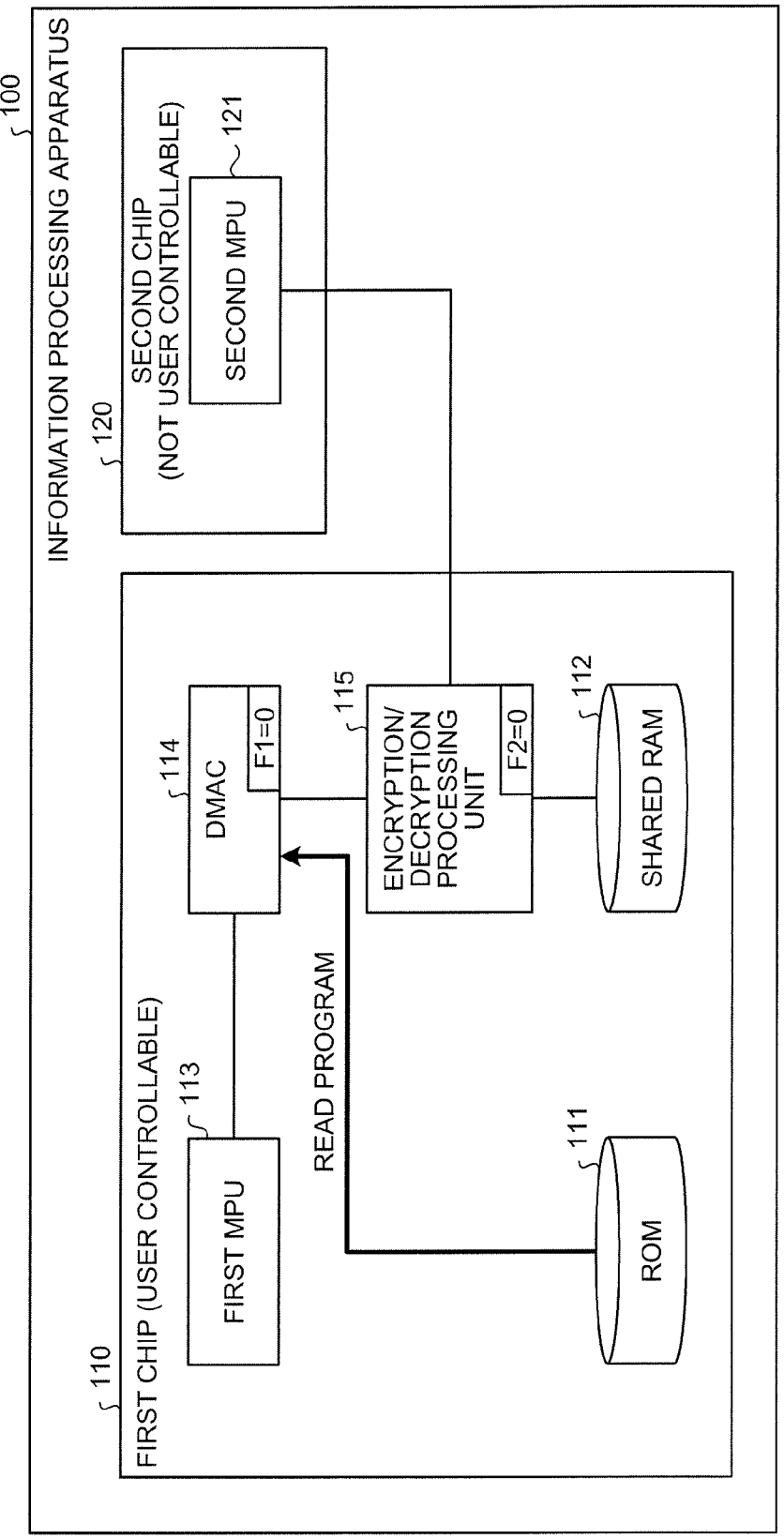
FIGS. 2, 3, and 4 are diagrams of an example of operation of the information processing apparatus according to the first embodiment.
Figure 3:
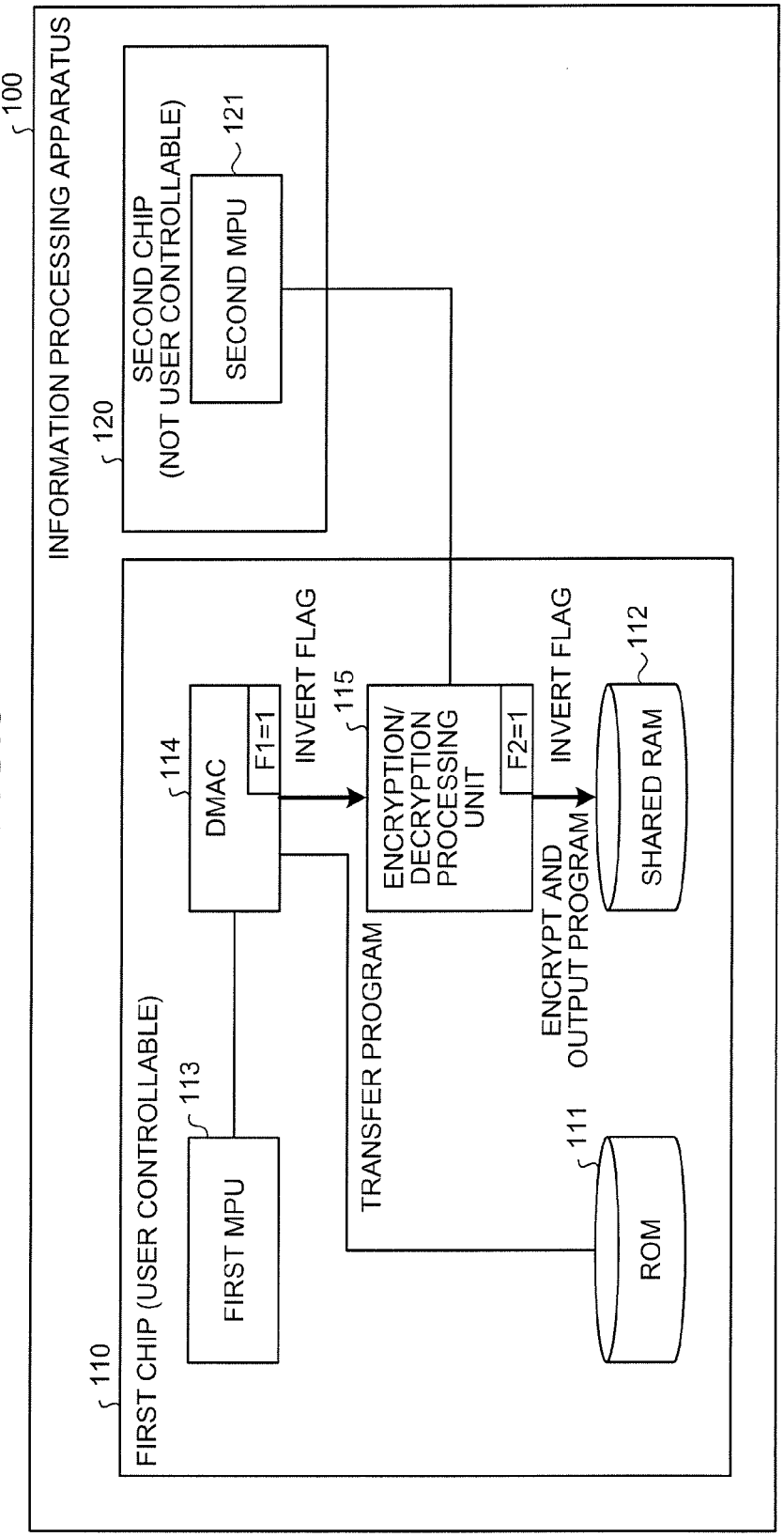
Figure 4:
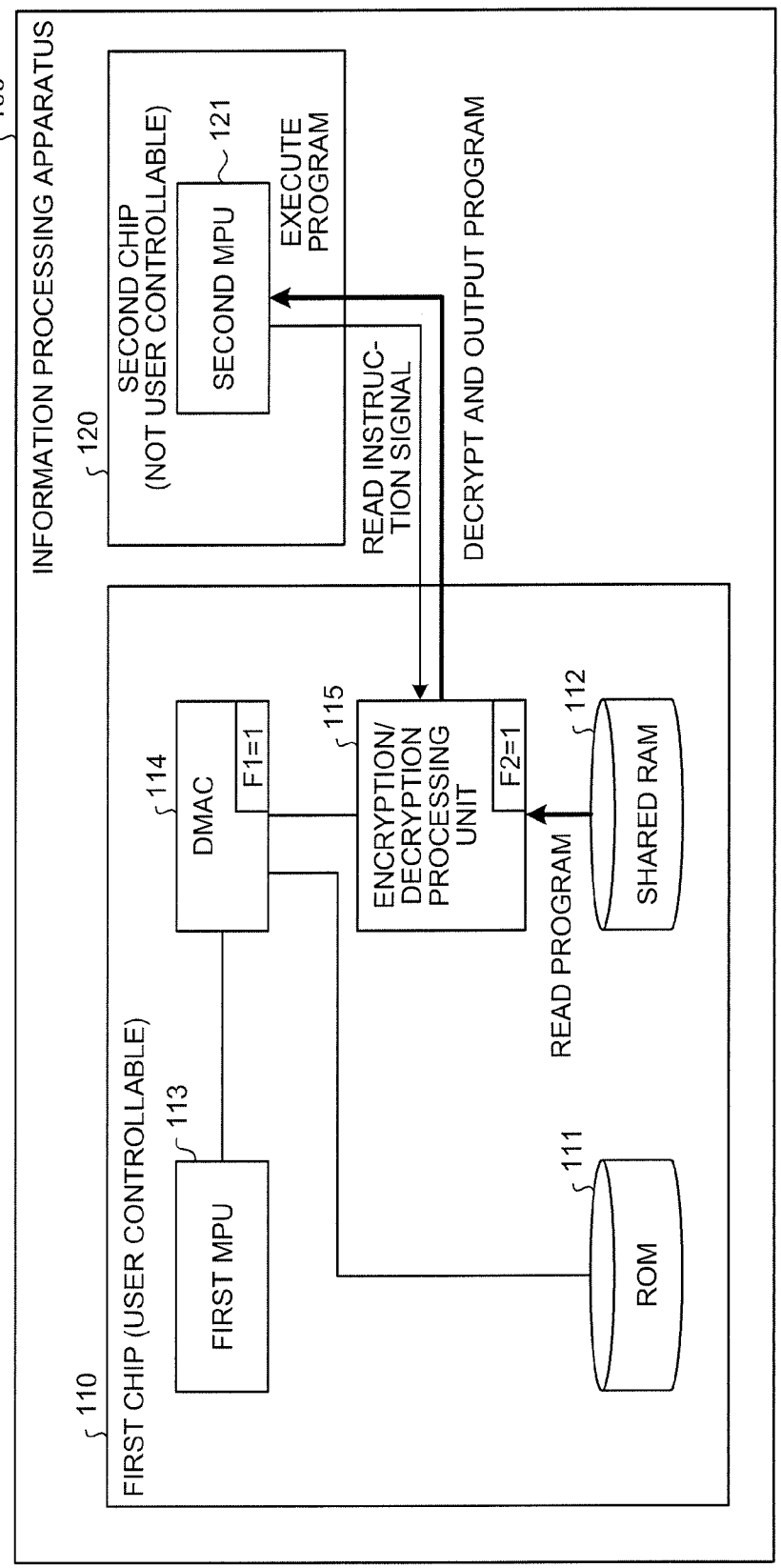

FIGS. 2, 3, and 4 are diagrams of an example of operation of the information processing apparatus according to the first embodiment. In FIGS. 2 to 4, components identical to those depicted in FIG. 1 are given the same reference numerals used in FIG. 1 and will not again be described. As depicted in FIG. 2, when the information processing apparatus 100 is started up, the first flag F1 of the DMAC 114 and the second flag F2 of the encryption/decryption processing unit 115 both indicate "0". Further, when the information processing apparatus 100 is started up, the DMAC 114 automatically reads a program that is to be executed by the second MPU 121 and stored in the predetermined area of the ROM 111.

As depicted in FIG. 3, the DMAC 114 transfers the read program to the encryption/decryption processing unit 115 and inverts the first flag F1 to indicate "1". The encryption/decryption processing unit 115 encrypts the program transferred from the DMAC 114, outputs the encrypted program to the shared RAM 112, and inverts the second flag F2 to indicate "1".

Thus, the program to be executed by the second MPU 121 is written into the predetermined area of the shared RAM 112 while in an encrypted state. The encryption/decryption processing unit 115 checks whether the program transferred from the DMAC 114 has been subject to tampering and if determining that the program has been subject to tampering, the encryption/decryption processing unit 115 does not output the encrypted program to the shared RAM 112.

As depicted in FIG. 4, the encryption/decryption processing unit 115 reads and decrypts the program written in the predetermined area of the shared RAM 112 according to the read instruction signal from the second MPU 121, and outputs the decrypted program to the second MPU 121. The second MPU 121 executes the program output from the encryption/decryption processing unit 115.

As described, when the information processing apparatus 100 is started up, the DMAC 114 automatically reads the program from the ROM 111 and transfers the read program to the shared RAM 112. Upon which, the encryption/decryption processing unit 115 automatically checks the program for tampering and encrypts the program.

The DMAC 114 automatically transfers the program just in the first session using the first flag F1 retained in the register, etc. and executes no automatic transfer of the program in the second and subsequent sessions. The encryption/decryption processing unit 115 checks the program for tampering and encrypts the program just in the first session using the second flag F2 retained in the register, etc. and executes no checking of the program for tampering and no encryption of the program in the second and subsequent sessions.

Figure 5:
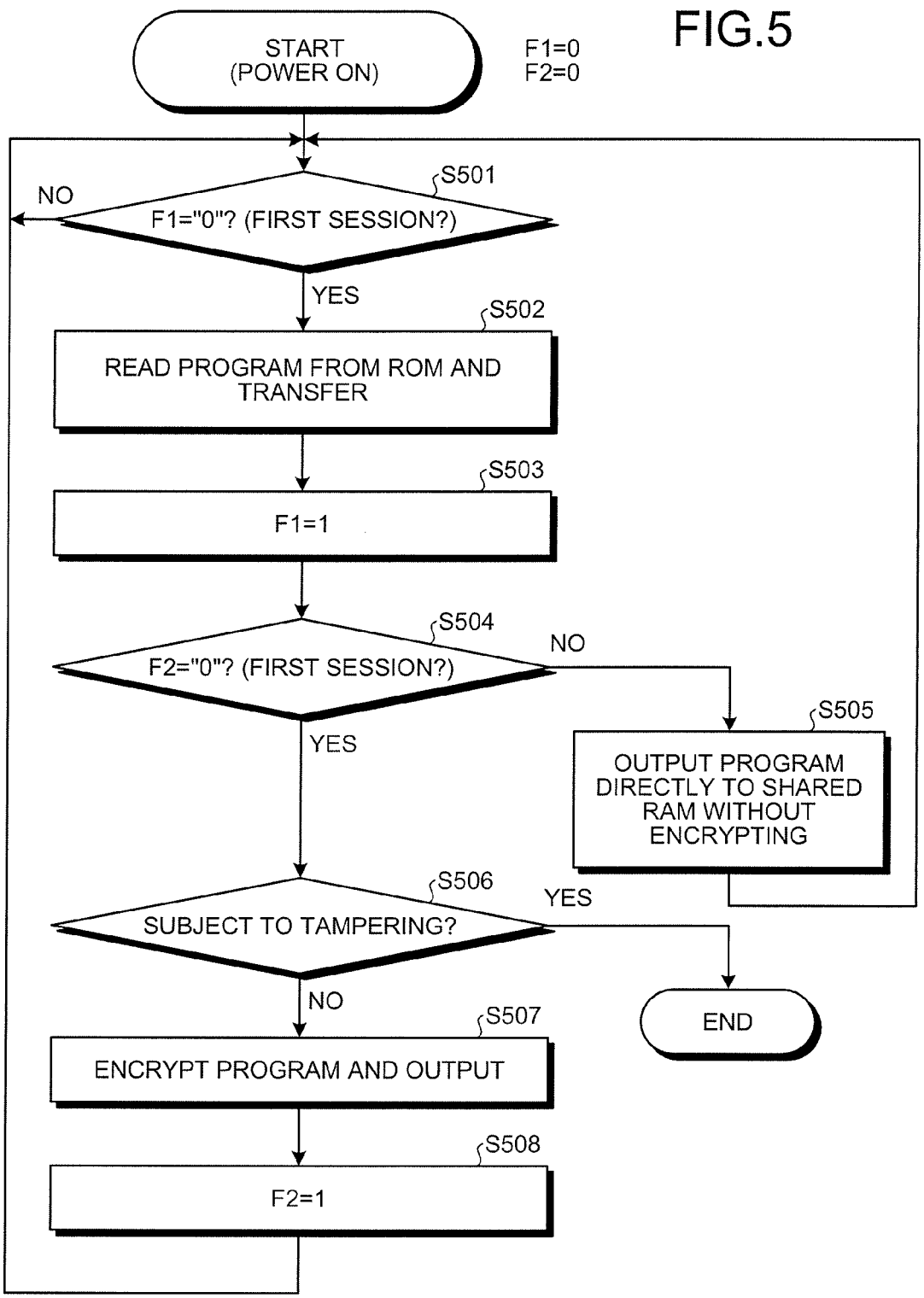
FIG. 5 is a flowchart of an example of the operation of the information processing apparatus according to the first embodiment.

FIG. 5 is a flowchart of an example of the operation of the information processing apparatus according to the first embodiment. When the power of the information processing apparatus 100 is turned on (POWER ON), the information processing apparatus 100 executes, for example, the steps as below. It is assumed that, immediately after the power is turned on, the first flag F1 of the DMAC 114 and the second flag F2 of the encryption/decryption processing unit 115 both indicate "0".

The DMAC 114 determines whether the first flag F1 indicates "0" (step S501). Thus, the DMAC 114 can determine whether the program transfer session is the first session. If the DMAC 114 determines that the first flag F1 does not indicate "0" (step S501: NO), the DMAC 114 determines that the program transfer session is not the first program transfer session. In this case, the DMAC 114 returns to the operation at step S501 and does not execute the automatic transfer of the program from the ROM 111 to the shared RAM 112, via the encryption/decryption processing unit 115.

If the DMAC 114 determines that the first flag F1 indicates "0" (step S501: YES), the DMAC 114 determines that this program transfer session is the first program transfer session. In this case, the DMAC 114 reads the program that is to be executed by the second MPU 121 and stored in the predetermined area of the ROM 111, and transfers the read program to the encryption/decryption processing unit 115 (step S502). The DMAC 114 inverts the first flag F1 to indicate "1" (step S503).

The encryption/decryption processing unit 115 determines whether the second flag F2 indicates "0" (step S504). Thus, the encryption/decryption processing unit 115 can determine whether the program transfer session is the first program transfer session. If the encryption/decryption processing unit 115 determines that the second flag F2 does not indicate "0" (step S504: NO), the encryption/decryption processing unit 115 determines that the program transfer session is not the first program transfer session. In this case, the encryption/decryption processing unit 115 does not encrypt the program transferred thereto at step S502 and directly outputs the transferred program to the shared RAM 112 (step S505) and returns to the operation at step S501.

If the encryption/decryption processing unit 115 determines that the second flag F2 indicates "0" (step S504: YES), the encryption/decryption processing unit 115 determines that the program transfer session is the first program transfer session. In this case, the encryption/decryption processing unit 115 determines whether the program transferred thereto at step 502 has been subject to tampering, based on a predetermined tampering check process (step S506).

If the encryption/decryption processing unit 115 determines that the program has been subject to tampering (step S506: YES), the encryption/decryption processing unit 115 does not encrypt or output to the shared RAM 112, the program transferred thereto at step S502, and causes the series of operations to come to an end. In this case, the encryption/decryption processing unit 115 may output an error message, etc.

If the encryption/decryption processing unit 115 determines that the program has not be subject to tampering (step S506: NO), the encryption/decryption processing unit 115 encrypts the program transferred thereto at step S502 and outputs the encrypted program to the shared RAM 112 (step S507). Thus, the encrypted program is stored to the predetermined area of the shared RAM 112.

The encryption/decryption processing unit 115 inverts the second flag F2 to indicate "1" (step S508) and returns to the operation at step S501. Thereafter, the encryption/decryption processing unit 115 reads and decrypts the program written in the predetermined area of the shared RAM 112 according to a read instruction signal from the second MPU 121, and outputs the decrypted program to the second MPU 121.

When the power of the information processing apparatus 100 is turned off, the first flag F1 of the DMAC 114 and the second flag F2 of the encryption/decryption processing unit 115 are both reset and indicate "0".

According to the operation steps, the program that is to be protected and executed by the second MPU 121 is encrypted before the program is transferred to the shared RAM 112 and this encryption may be adapted to be permitted only when the information processing apparatus 100 is started up.

As described, according to the information processing apparatus 100 according to the first embodiment, the program to be protected and executed by the second MPU 121 is encrypted before the program is transferred to the shared RAM 112, whereby the number of transfer sessions can be suppressed. Consequently, the start up time of the program to be executed by the second MPU 121 can be reduced. The encryption is permitted only when the information processing apparatus 100 is started up, whereby any transfer of arbitrary data and decryption of an encryption key by a third party can be prevented, enabling security to be improved.

For example, it can be considered that a malicious third party acts as described below to decrypt the encryption key that is necessary for disassembling the program. The malicious third party writes arbitrary data into the shared RAM 112; writes the data back into the shared RAM 112 via the encryption/decryption processing unit 115 by causing the first MPU 113 to instruct the DMAC 114 to do such; and decrypts the encryption key by comparing the data before the encryption and the data after the encryption.

On the contrary, in the information processing apparatus 100, encryption is permitted only in the first session after the power is turned on. Therefore, the malicious third party cannot write the encrypted data into the shared RAM 112 even when the malicious third party acts as described above; and therefore, is unable to compare the data before the encryption and the data after the encryption. Consequently, decryption of the encryption key becomes difficult.

If the ROM 111 is rewritable flash ROM, etc., a third party can rewrite the storage content of the ROM 111 from the first MPU 113. The malicious third party writes arbitrary data into the ROM 111, whereby the encrypted data is written into the shared RAM 112 at the next turning on of the power. Therefore, it can also be considered that the encryption key can be decrypted by comparing data before the encryption with the data after the encryption.

On the contrary, in the information processing apparatus 100, whether the program written into the ROM 111 has been subject to tampering is checked immediately after the power is turned on and if it is determined that the program has been subject to tampering, no encryption and no output to the shared RAM 112 are executed. Thus, decryption of the encryption key becomes difficult.

The running of a tampered program can be prevented by the tampering check even if the confidentiality of the encryption key has been compromised, the program has been subject to tampering and written into the ROM 111.

Consequently, for example, the time consumed for the start up can be reduced, preventing any malicious third party from decrypting the encryption key, tampering with the program, and maliciously using the tampered program (such as, for example, disguising the telephone number of the malicious third party as another number and thereby, escaping the payment of the call charge, etc.). The shared RAM 112 is shared between the first and the second MPUs 113 and 121, enabling reductions in size and cost.

The information processing apparatus 100 can be applied to, for example, a mobile telephone apparatus, etc. that is equipped with plural microcomputers. Thus, for example, a mobile telephone can be implemented that is smaller in size and lower in cost consequent to the sharing of memory and that is started up at a high speed while protecting the programs therein from tampering by a malicious third party.

In a second embodiment, components that differ from those of the first embodiment will be described.

Figure 6:
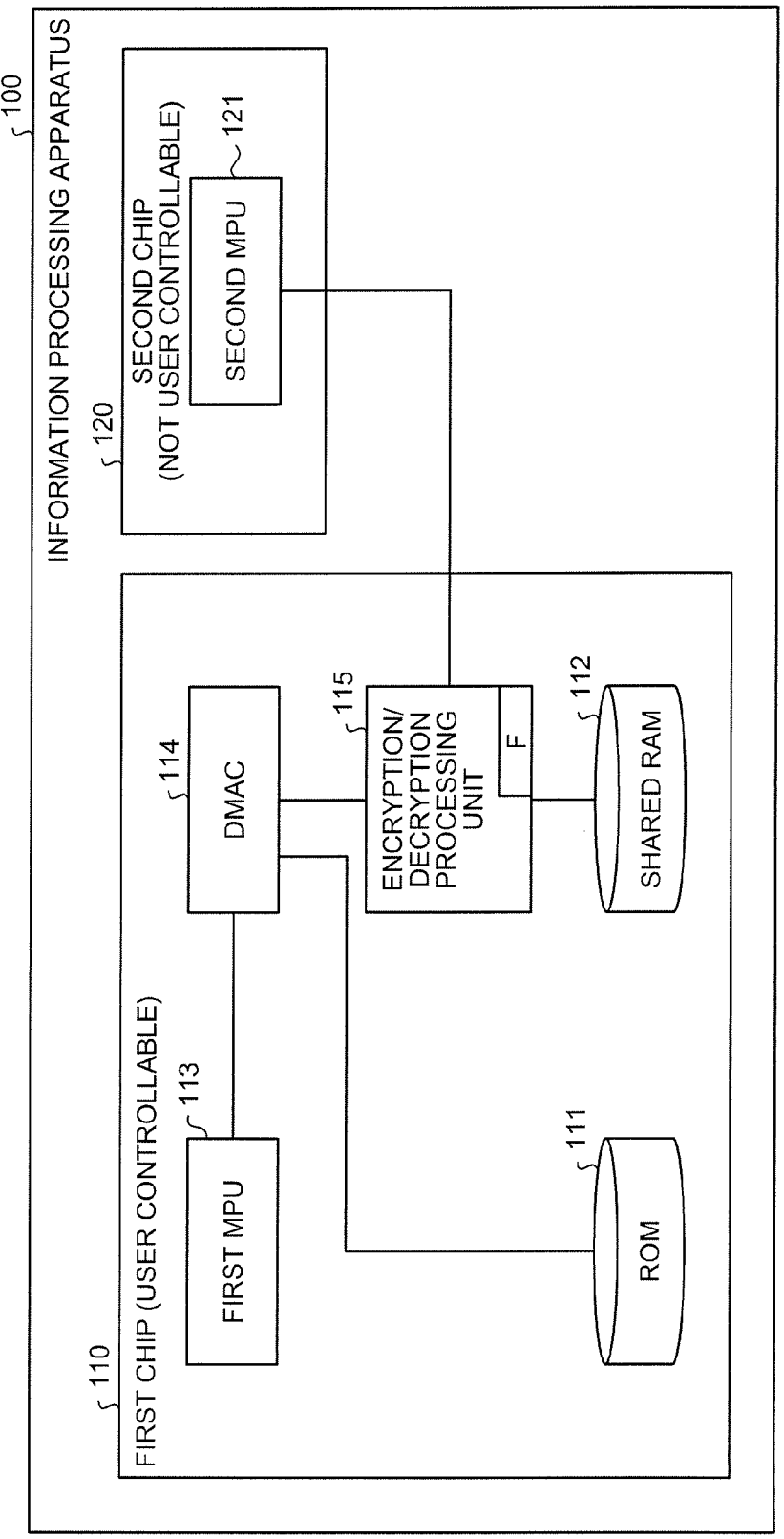
FIG. 6 is a diagram of an example of a configuration of the information processing apparatus according to a second embodiment.

FIG. 6 is a diagram of an example of a configuration of the information processing apparatus according to the second embodiment. In FIG. 6, components identical to those depicted in FIG. 1 are given the same reference numerals used in FIG. 1 and will not again be described. As depicted in FIG. 6, in the information processing apparatus 100 according to the second embodiment, the encryption/decryption processing unit 115 retains by a register, etc., a flag F that indicates whether the encryption session to be executed is the first encryption session. In this case, the DMAC 114 does not need to retain any flag. The flag F of the encryption/decryption processing unit 115 is rewritten according to, for example, control by the second MPU 121.

Figure 7:
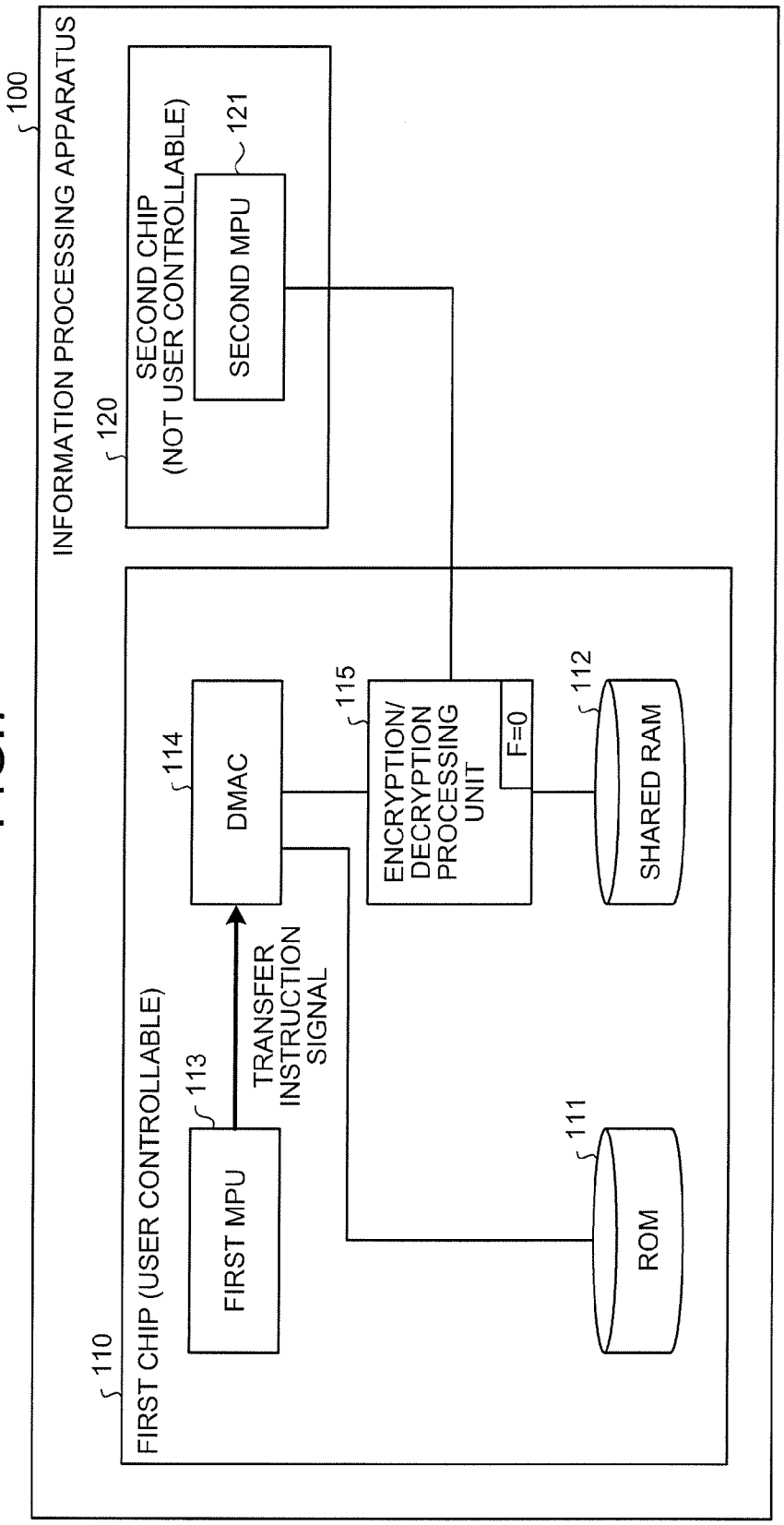
FIGS. 7, 8, 9, and 10 are diagrams of an example of operation of the information processing apparatus according to the second embodiment.
Figure 8:
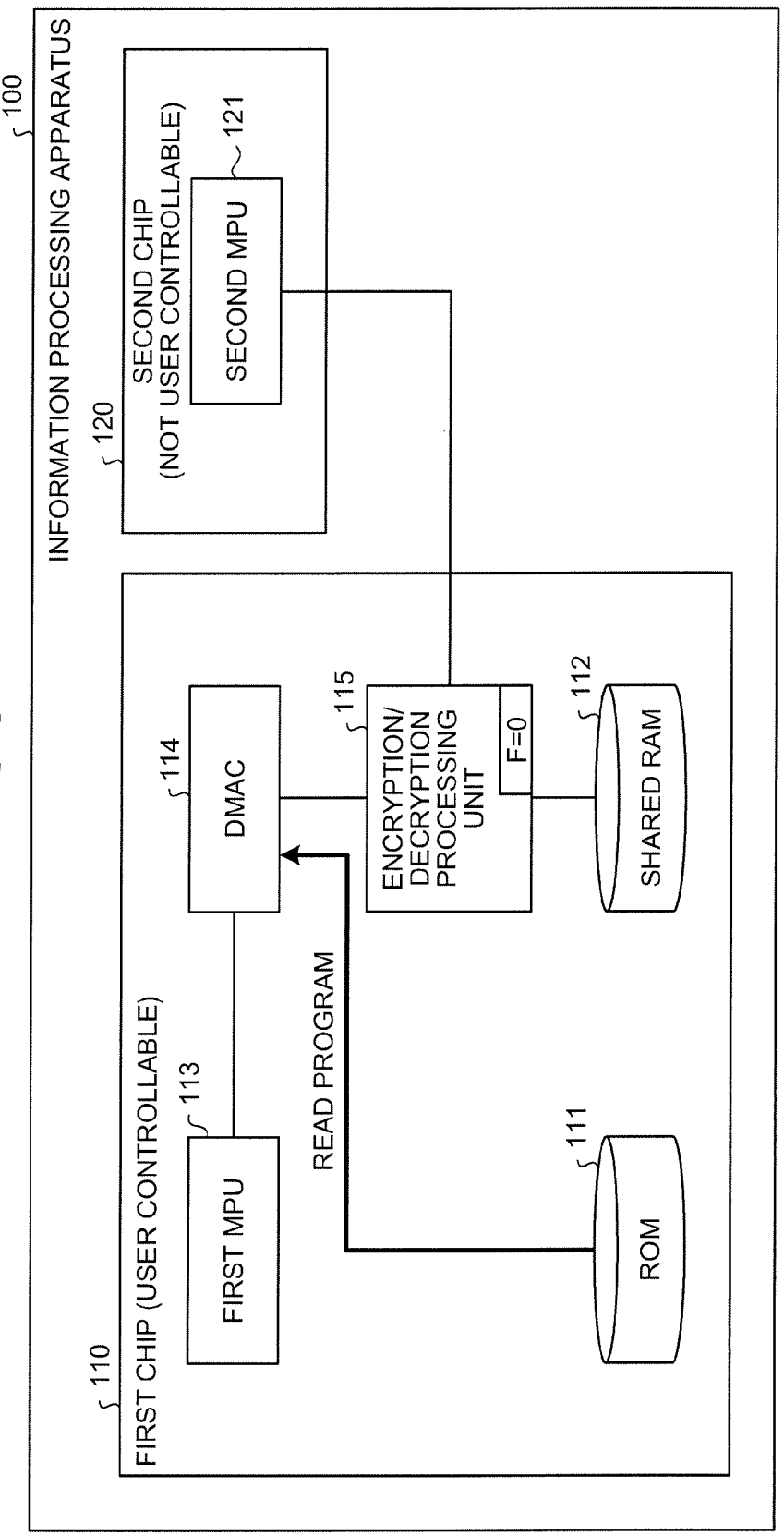

FIGS. 7, 8, 9, and 10 are diagrams of an example of operation of the information processing apparatus according to the second embodiment. In FIGS. 7 to 10, components identical to those depicted in FIG. 6 are given the same reference numerals used in FIG. 6 and will not again be described. As depicted in FIG. 7, when the information processing apparatus 100 is started up, the flag F of the encryption/decryption processing unit 115 indicates "0". Further, when the information processing apparatus 100 is started up, the first MPU 113 automatically outputs a transfer instruction signal to the DMAC 114. As depicted in FIG. 8, the DMAC 114 reads the program that is to be executed by the second MPU 121 and stored in the predetermined area of the ROM 111.

Figure 9:
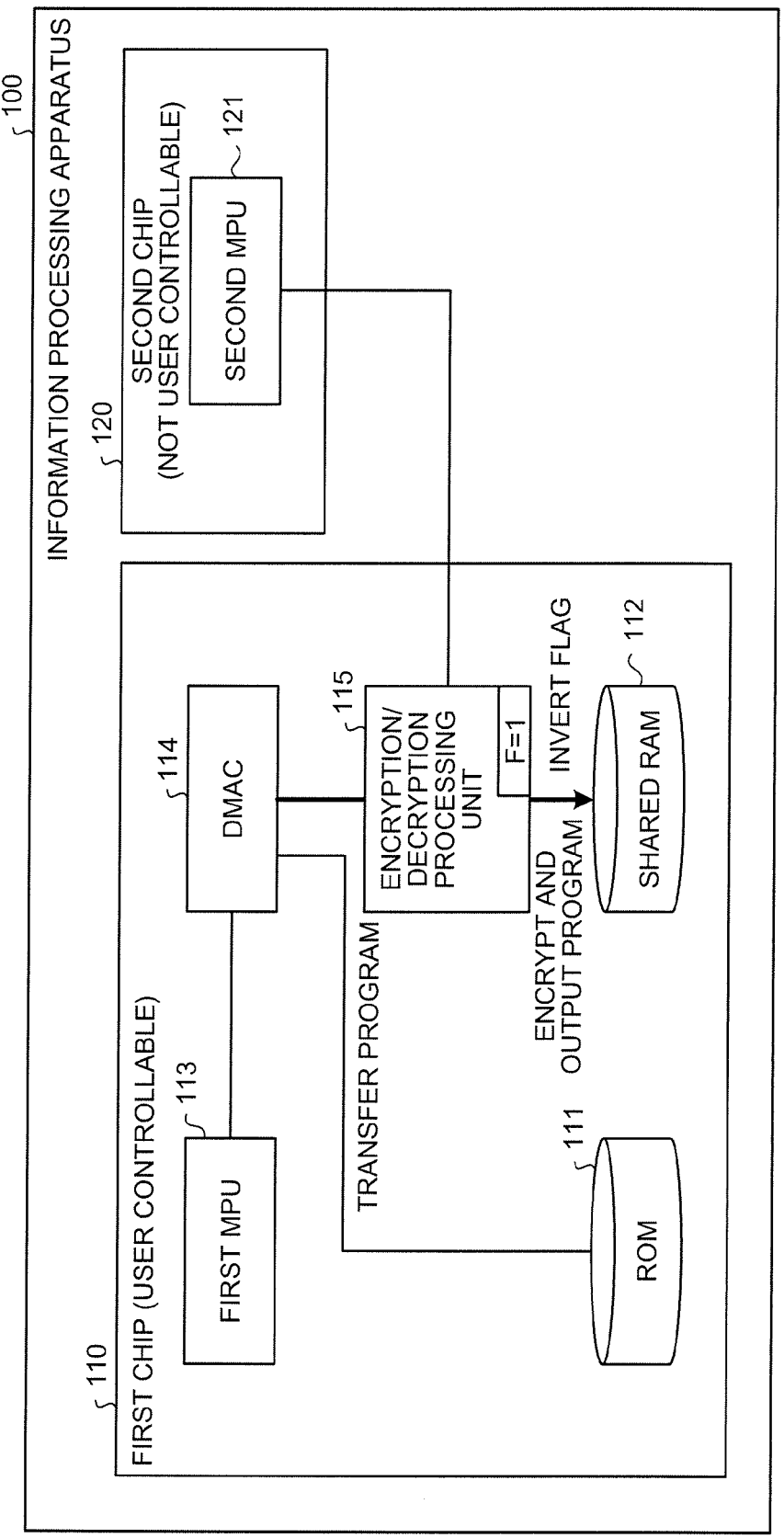

As depicted in FIG. 9, the DMAC 114 transfers the read program to the encryption/decryption processing unit 115. The encryption/decryption processing unit 115 encrypts the program transferred thereto from the DMAC 114 and outputs the encrypted program to the shared RAM 112. The flag F of the encryption/decryption processing unit 115 is inverted to indicate "1" according to control by the second MPU 121.

Thus, the encrypted program is written into the predetermined area of the shared RAM 112. The encryption/decryption processing unit 115 checks whether the program transferred thereto from the DMAC 114 has been subject to tampering. If the encryption/decryption processing unit 115 determines that the program has been subject to tampering, the encryption/decryption processing unit 115 does not output the encrypted program to the shared RAM 112.

Figure 10:
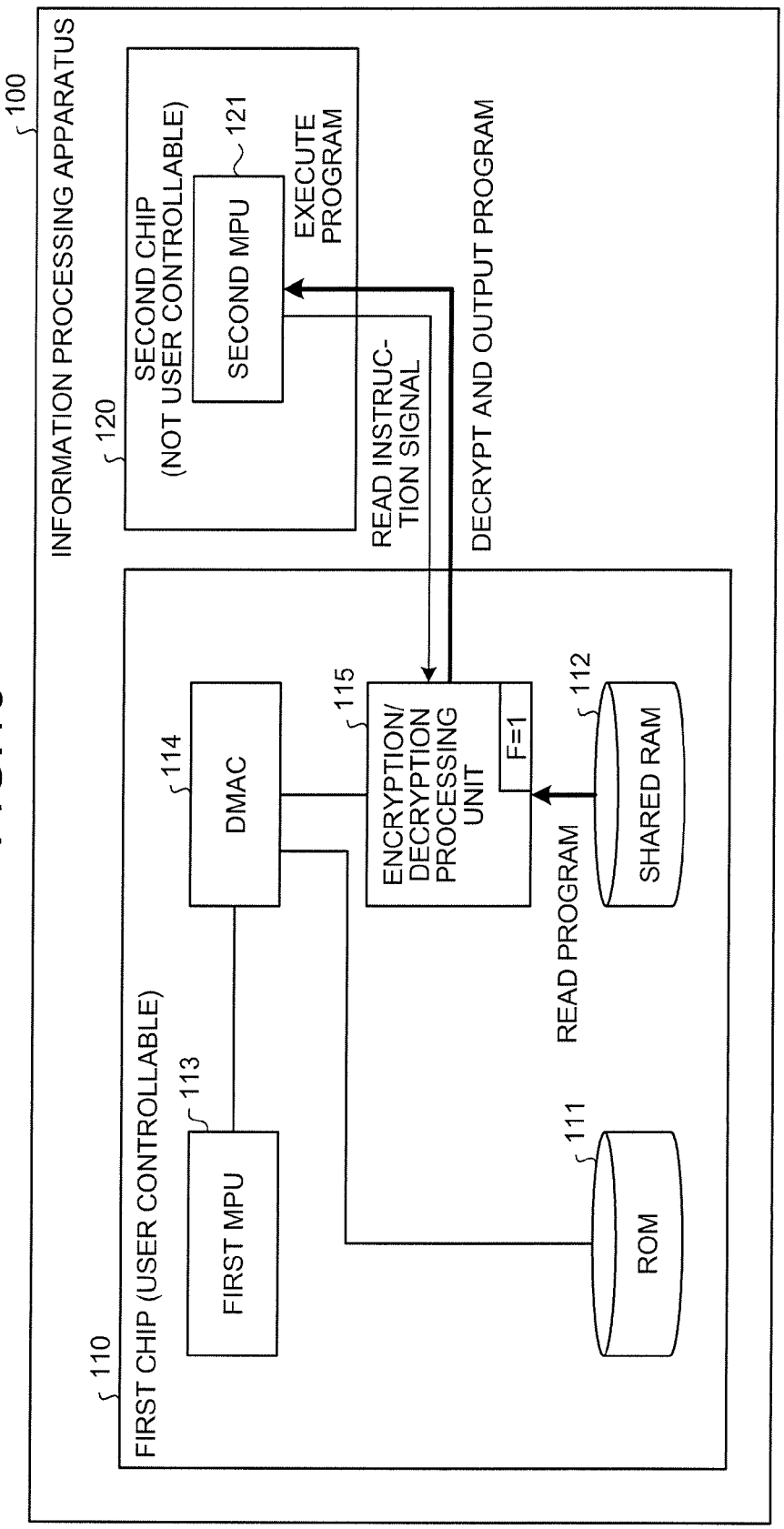

As depicted in FIG. 10, the encryption/decryption processing unit 115 reads and decrypts the program written in the predetermined area of the shared RAM 112 according to the read instruction signal from the second MPU 121, and outputs the decrypted program to the second MPU 121. The second MPU 121 executes the program output from the encryption/decryption processing unit 115.

As described, when the information processing apparatus 100 is started up, the first MPU 113 instructs the DMAC 114, whereby the program is read from the ROM 111 and transferred. Upon which, the encryption/decryption processing unit 115 automatically executes the tampering check and encryption. The encryption/decryption processing unit 115 encrypts the program just in the first session and does not encrypt the program in the second and subsequent sessions, using the flag F retained by the register, etc.

Figure 11:
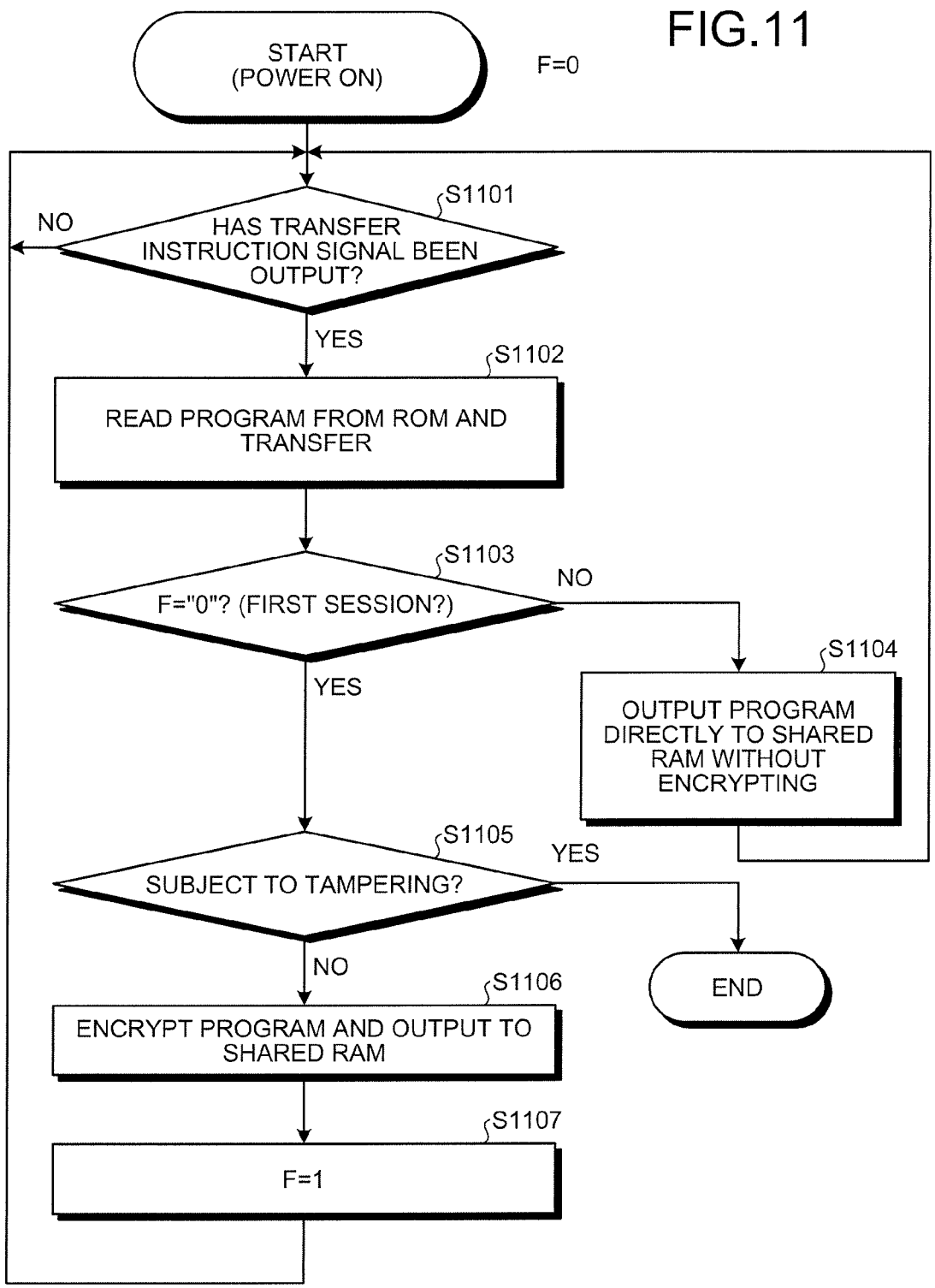
FIG. 11 is a flowchart of an example of the operation of the information processing apparatus according to the second embodiment.

FIG. 11 is a flowchart of an example of the operation of the information processing apparatus according to the second embodiment. When the power of the information processing apparatus 100 is turned on (POWER ON), the information processing apparatus 100 executes, for example, the steps as below. It is assumed that, immediately after the power is turned on, the flag F of the encryption/decryption processing unit 115 indicates "0".

The DMAC 114 determines whether a transfer instruction signal has been output from the first MPU 113 (step S1101) and waits for a transfer instruction signal to be output (step S1101: NO). When the DMAC 114 determines that a transfer instruction signal has been output (step S1101: YES), the DMAC 114 reads the program that is to be executed by the second MPU 121 and stored in the predetermined area of the ROM 111, and transfers the read program to the encryption/decryption processing unit 115 (step S1102).

The encryption/decryption processing unit 115 determines whether the flag F indicates "0" (step S1103). Thus, the encryption/decryption processing unit 115 can determine whether the program transfer session is the first program transfer session. If the encryption/decryption processing unit 115 determines that the flag F does not indicate "0" (step S1103: NO), the encryption/decryption processing unit 115 determines that the program transfer session is not the first program transfer session. In this case, the encryption/decryption processing unit 115 does not encrypt the program transferred thereto at step S1102 and directly outputs the program to the shared RAM 112 (step S1104), and returns to the operation at step S1101.

If the encryption/decryption processing unit 115 determines that the flag F indicates "0" (step S1103: YES), the encryption/decryption processing unit 115 determines that this program transfer session is the first program transfer session. In this case, the encryption/decryption processing unit 115 executes a predetermined tampering check process and thereby, determines whether the program transferred thereto at step S1102 has been subject to tampering (step S1105).

If the encryption/decryption processing unit 115 determines that the program has been subject to tampering (step S1105: YES), the encryption/decryption processing unit 115 does not encrypt or output to the shared RAM 112, the program transferred thereto at step S1102, and causes the series of operation steps to come to an end. In this case, the encryption/decryption processing unit 115 may output an error message, etc.

If the encryption/decryption processing unit 115 determines that the program has not be subject to tampering (step S1105: NO), the encryption/decryption processing unit 115 encrypts the program transferred thereto at step S1102 and outputs the encrypted program to the shared RAM 112 (step S1106). Thus, the encrypted program is stored to the predetermined area of the shared RAM 112.

The encryption/decryption processing unit 115 inverts the flag F to indicate "1" according to the control by the second MPU 121 (step S1107) and returns to the operation at step S1101. Thereafter, the encryption/decryption processing unit 115 reads and decrypts the program written in the predetermined area of the shared RAM 112 according to the read instruction signal from the second MPU 121 and outputs the decrypted program to the second MPU 121. The flag F of the encryption/decryption processing unit 115 is reset to indicate "0" when the power of the information processing apparatus 100 is turned off.

According to the above steps, the program to be protected and to be executed by the second MPU 121 is encrypted before the program is transferred to the shared RAM 112 and this encryption is permitted only when the information processing apparatus 100 is started up.

As described, according to the information processing apparatus 100 according to the second embodiment, similar to that of the first embodiment, the program to be protected can be encrypted before the program is transferred to the shared RAM 112, whereby the number of transfer sessions can be suppressed. Therefore, the time consumed for starting up the program that is to be executed by the second MPU 121 can be reduced. The encryption is permitted only when the information processing apparatus 100 is started up and therefore, any transfer of arbitrary data and decryption of an encryption key by a third party can be prevented, enabling security to be improved.

As described, the control method and the information processing apparatus enabling reduction of the time consumed for starting up the program to be protected.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method that is executed by an information processing apparatus that includes a first processor, a second processor that executes a program to be protected, a first memory configured to be shared between the first and the second processors, a non-volatile second memory configured to store the program to be protected, and a storage unit configured to store information that indicates a first value when the information processing apparatus is started up, the control method comprising:
   reading the program that is to be protected and stored in the non-volatile second memory, when the information processing apparatus is started up;
   encrypting the read program only once after the start up of the information processing apparatus;
   determining whether the read program has been subject to tampering;
   writing the encrypted program into the first memory, when it is determined that the read program has not been subject to tampering,
   refraining from writing the encrypted program into the first memory, when it is determined that the read program has been subject to tampering;
   rewriting the information stored in the storage unit to a second value that is different from the first value, when the information stored in the storage unit indicates the first value;
   refraining from writing the encrypted program into the first memory, when the information stored in the storage unit does not indicate the first value;
   decrypting the encrypted program that is written in the first memory; and
   causing the second processor to execute the decrypted program.

2. The control method according to claim 1, wherein the reading of the program is executed only once after the information processing apparatus is started up.

3. The control method according to claim 1, wherein the reading of the program is executed under control by the first processor.

4. The control method according to claim 1, wherein the encrypting of the read program is executed by a control circuit that is not controllable by a user.

5. The control method according to claim 1, wherein the first processor is a processor that is controllable by a user.

6. An information processing apparatus comprising:
   a first processor;
   a second processor configured to execute a program to be protected;
   a first memory configured to be shared between the first and the second processors;
   a non-volatile second memory configured to store the program to be protected;
   a storage unit configured to store information that indicates a first value when the information processing apparatus is started up; and
   a control circuit configured to:
   cause the first processor to read the program that is to be protected and stored in the non-volatile second memory, when the information processing apparatus is started up;
   encrypt the read program only once after the start up of the information processing apparatus;
   determining whether the read program has been subject to tampering;
   write the encrypted program into the first memory, when it is determined that the read program has not been subject to tampering,
   refraining from writing the encrypted program into the first memory, when it is determined that the read program has been subject to tampering;
   rewriting the information stored in the storage unit to a second value that is different from the first value, when the information stored in the storage unit indicates the first value when the information stored in the storage unit indicates the first value;
   refraining from writing the encrypted program into the first memory, when the information stored in the storage unit does not indicate the first value;
   decrypt the encrypted program that is written in the first memory; and
   cause the second processor to execute the decrypted program.

* * * * *